(12) United States Patent
Ruttenberg et al.

(10) Patent No.: US 7,552,866 B2
(45) Date of Patent: Jun. 30, 2009

(54) SYSTEM AND METHOD FOR TRANSFERRING A FINANCIAL TRANSACTION ACCOUNT ACCORDING TO PREDETERMINED CRITERIA

(75) Inventors: Noga Ruttenberg, Rye, NY (US); Jennifer Bernstein, New York, NY (US); Carl T. Horton, Jr., Bridgeport, CT (US); Scott B. Brooks, Metuchen, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 650 days.

(21) Appl. No.: 11/294,503

(22) Filed: Dec. 5, 2005

(65) Prior Publication Data

US 2007/0198402 A1   Aug. 23, 2007

Related U.S. Application Data

(60) Provisional application No. 60/729,774, filed on Oct. 24, 2005.

(51) Int. Cl.
*G06Q 40/00* (2006.01)
(52) U.S. Cl. .................. 235/379; 235/380; 235/382; 705/39; 705/44; 705/14
(58) Field of Classification Search .............. 235/379, 235/380, 382.5, 382; 705/39, 44
See application file for complete search history.

(56) References Cited

U.S. PATENT DOCUMENTS

| | | | |
|---|---|---|---|
| 6,615,189 B1 * | 9/2003 | Phillips et al. ............. 705/41 |
| 2002/0174048 A1 * | 11/2002 | Dheer et al. ................ 705/36 |
| 2006/0116949 A1 * | 6/2006 | Wehunt et al. .............. 705/35 |
| 2006/0235748 A1 | 10/2006 | Gordon et al. .............. 705/14 |
| 2006/0277139 A1 * | 12/2006 | Poltorak ..................... 705/38 |

FOREIGN PATENT DOCUMENTS

WO   WO 0060487 A1 * 10/2000

OTHER PUBLICATIONS

"Nextcard© And The Knot Announce E-Commerce Alliance," The Knot Press Release, San Francisco, California, Jun. 23, 1999, available at www.theknot.com/06.23.99.shtml.

(Continued)

*Primary Examiner*—Michael G Lee
*Assistant Examiner*—Kristy A Haupt
(74) *Attorney, Agent, or Firm*—Fitzpatrick, Cella, Harper & Scinto (57) ABSTRACT

Migration of a first type of financial transaction instrument to a second type of financial transaction instrument is beneficial when the first instrument no longer is suitable for an account holder due to a change in the account holder's situation. A list of consumers for which an event has occurred during a pre-defined time period is compared with a list of account holders of the first instrument to determine an account holder for which the event has occurred during the pre-defined time period. If it is determined that the account holder has provided prior instructions authorizing automatic migration, then the first instrument is migrated to the second instrument by issuing the second instrument, notifying the account holder that migration has taken place or will take place, and updating account information to indicate migration to the second instrument.

9 Claims, 4 Drawing Sheets

OTHER PUBLICATIONS

"The Knot And MBNA Team Up To Create A Wedding Loan Program," The Knot Press Release, New York, New York, Mar. 7, 2000, available at www.theknot.com/03/07/00.shtml.

"The Knot Announces a Two-Year Strategic Marketing Alliance With Synovus Financial Corp.'s Pointpathblank; The Leading Online Wedding Website and New Internet-Only Bank Join Forces to Serve Brides and Grooms," Business Wire, New York, Feb. 29, 2000, available at www.highbeam.com/DocPrint.aspx?DocId=1G1:59641661.

"Synovus Announces Pointpathbank.com," Synovus Press Reselase, Columbus, Georgia, Feb. 29, 2000, available at www.synovus.com/index/cfm?catID=newsrelease&set=Synovus&nrid=109.

"American Express and Th Knot, Inc. Launch Unique Credit Cards Designed Specifically For Engaged Couples And Newlyweds," PRNewswire, New York, Dec. 1, 2005, available at www.prnewswire.com/cgi-bin/stories.pl?ACCT=104&STORY=/www/story/12-01-2005/00. . .

A. Fass, "Wedding March," Forbes.com, Dec. 12, 2005, available at www.forbes.com/forbes/2005/1212/088_print.html.

* cited by examiner

SYSTEM AND METHOD FOR TRANSFERRING A FINANCIAL TRANSACTION ACCOUNT ACCORDING TO PREDETERMINED CRITERIA

CROSS REFERENCE TO RELATED APPLICATION

This application claims priority to and benefit of U.S. Provisional Patent Application No. 60/729,774 filed on Oct. 24, 2005, entitled SYSTEM AND METHOD FOR TRANSFERRING A FINANCIAL TRANSACTION ACCOUNT ACCORDING TO PREDETERMINED CRITERIA, the entire disclosure of which is incorporated herein by reference.

BACKGROUND OF THE INVENTION

1. Field of the Invention

The present invention generally relates to a system and a method for transferring a financial transaction account of an account holder from one type of account to another type of account based on changes in the account holder's life. More particularly, the present invention relates to a system and a method for using date-based triggers to transfer the account holder's financial transaction account.

2. Related Art

Consumers very often use financial transaction instruments as convenient forms of payment for purchases of goods and/or services ("goods/services"). A "financial transaction instrument," also referred to herein as a "card," may be any of the following: a traditional "plastic" transaction card (e.g., a credit card, a charge card, a debit card, a gift card, a pre-paid or stored-value card, or the like); a titanium-containing, or other metal-containing, transaction card; a clear or translucent transaction card; a foldable or otherwise unconventionally-sized transaction card; a radio-frequency-enabled transaction card; or any other type of card used in connection with a financial transaction.

A financial transaction instrument may be configured with electronic functionality. For example, such an instrument can have electronic circuitry that is printed or otherwise incorporated onto or within it (commonly being referred to as a "smart card"), or may be a fob-type device having a transponder and a radio-frequency identification ("RFID") reader. Additionally, a financial transaction instrument may be magnetically encoded with information, such as through use of a magnetic stripe, for example. Optionally, a financial transaction instrument may include a visible card identification number ("CID") uniquely identifying a corresponding transaction account, in case the transaction instrument cannot easily be read electronically or magnetically.

A "transaction account," as used herein, refers to an account associated with an open-account system or a closed-account system, which are discussed in more detail below. A transaction account may exist in a physical or a non-physical embodiment. For example, a transaction account may be distributed in a non-physical embodiment such as an account number, a frequent-flyer account, a telephone calling account, or the like. Furthermore, a physical embodiment of a transaction account may be distributed as a financial transaction instrument.

"Open cards" are financial transaction instruments associated with an open-account system and generally are accepted by different merchants. Examples of open cards include the American Express®, Visa®, MasterCard®, and Discover® cards, which may be used at many different retailers and other businesses. In contrast, "closed cards" are financial transaction instruments associated with a closed-account system and may be restricted to use in a particular store, a particular chain of stores, or a collection of affiliated stores. One example of a closed card is a pre-paid gift card for The Gap®, which typically is purchased at and may only be accepted at The Gap® stores. Note, however, that pre-paid gift cards, also known as stored-value cards, are not limited to closed cards but instead may be open cards issued by, for example, American Express®, Visa®, Discover®, MasterCard®, or the like.

Generally, a merchant that wants to provide customers with the option to pay for goods/services with a particular type of open card will enter into an agreement with the issuer of that type of card (e.g., American Express®, Visa®, Discover®, MasterCard®, or the like). The issuer typically is a financial organization (e.g., American Express®, JPMorgan Chase, MBNA®, Citibank®, or the like) whose card-issuing activities are government regulated.

Because of the wide use of cards by consumers, the types and number of merchants that accept cards has grown and now include, in addition to the more traditional merchants such as stores and restaurants, taxi drivers, doctors, schools, street vendors, on-line vendors, and government agencies, to name a few. Through the use of cards, merchants are able to obtain prompt payment for the purchased goods/services.

Issuers have a financial incentive to contract with as many merchants as possible to accept their cards. Typically, an issuer is paid a so-called "discount rate" by each merchant signed up to accept payment using the issuer's type of card. The discount rate may be, for example, a flat rate paid periodically or a rate based on the merchant's net sales that are paid for using the issuer's type of card.

In order to convince merchants to accept its card, an issuer may provide the merchants with assistance with the set-up process, at no cost to the merchants. The set-up process may include: providing the merchants with point-of-sale ("POS") devices, including hardware and software for reading cards; providing training to employees of the merchants as to how to use the POS devices; providing communication equipment and establishing communication procedures for obtaining quick payment authorizations; and troubleshooting services.

Merchants often form agreements with issuers to jointly develop and/or market financial transaction instruments, such as "branded" cards, "consumer-category" cards, etc. A branded card is a card that bears both the merchant's and the issuer's names, and can be used to pay for purchases wherever the issuer's type of card is accepted. The account holder of a branded card may receive benefits according to how the card is used. An example of this type of card is the American Express® Costco® Cash Rebate Card, which generally can be used like any American Express® Card, and which gives its account holder a cash rebate for purchases made with the card at Costco® stores. Another example of this type of card is the Chase Continental MasterCard® card, which generally can be used like any MasterCard® card, and which gives its account holder Continental Airlines frequent-flier miles for purchases made with the card.

A consumer-category card is a card directed to a particular consumer category, and can be used to pay for purchases wherever the issuer's type of card is accepted. The account holder of a consumer-category card may receive benefits for establishing an account with the issuer (i.e., acquiring a card), and also may receive special offers that are particularly relevant to consumers of that category. An example of this type of card is the Discover® Card KinderCare® Offer, which generally can be used like any Discover® card, and which gives its account holder a cash bonus for establishing the account. In this example, the consumer category of the account holder is "parent/guardian of young child(ren)," and the merchant (i.e., KinderCare®) and/or the issuer may provide the account holder with special offers that are of particular interest to that category of consumer, such as rebates on daycare fees paid for with the card, discounts on toys, merchandise previews for children's clothing, news bulletins on childhood diseases, fact sheets on nutrition, and/or the like.

One consideration for issuers of consumer-category cards is what to do when account holders no longer belong to the particular consumer categories of their cards. In the case of the above example, special offers that may be of interest to parents/guardians of young children may not be of any interest once the children grow up. The issuers, however, do not have an easy way of knowing when their account holders have moved on from their original categories. Therefore, the issuers continue to spend a great deal of money to promote special offers to account holders who no longer may be interested in the goods/services of those offers.

Given the foregoing, what is needed is a system, a method, and a computer program product for quickly and easily determining a current category or status of a consumer and transferring or migrating the consumer to another category or status if it is determined that the current category or status is no longer valid.

BRIEF DESCRIPTION OF THE INVENTION

The present invention meets the above-identified needs by providing a system, a method, and a computer program product that enables an issuer of a financial transaction instrument to transition or migrate an account holder from one type of financial transaction instrument or account to another type of financial transaction instrument or account based on changes in the account holder's situation. Such changes are based on predetermined criteria such as, for example, an occurrence of an event date.

An advantage of the present invention is that it allows the issuer to identify which account holders of consumer-category cards no longer belong to the particular consumer categories of their current cards and thus no longer may be interested in the promotions and other benefits associated with their current cards. By migrating such account holders to other more suitable category of consumer-category cards, the issuer may reduce the amount of money wasted on irrelevant promotions. Additionally, the issuer may encourage more merchants to enter into agreements with the issuer to issue specific types of consumer-category cards relevant to the merchants, by showing the merchants that a larger percentage of the cardholders or account holders of consumer-category cards issued by the issuer is likely to be interested in the merchants' goods/services due to the automatic migration of the cardholders or account holders who have outgrown or moved on from their former consumer-category cards to other types or categories of consumer-category cards.

According to the present invention, a cardholder migration process and a system for implementing the migration process are provided. In an embodiment, a consumer visits a Web site of a merchant that has a joint marketing/promotional program with an issuer to promote a financial transaction instrument, such as an event-oriented card, which is a card with features and/or benefits related to a planned event to take place in the future. The consumer registers with the merchant and provides the merchant with registration information, such as her name, her address (email and/or residential), and a date for a planned event. The merchant Web site presents the consumer with a Web page promoting the benefits of having the event-oriented card. If the consumer chooses to apply for the event-oriented card, the consumer is linked to an application Web page, which enables the consumer to apply for the event-oriented card in an on-line process. The application Web page asks the consumer whether she would like to take part in an automatic migration program and receive special offers and other information after the planned event takes place. If the consumer indicates that she would like to take part in the automatic migration program, the application is flagged for automatic migration. Alternatively, the consumer may use the Web site to obtain the application for the event-oriented card, which may be completed online or offline, and the consumer may discuss the application with a live representative of the merchant.

If the application is approved, the consumer is issued the event-oriented card or another type of financial transaction instrument with features and/or benefits related to a planned event.

If it is determined that the planned event has taken place (i.e., the migration trigger has occurred), account information including information provided in the application is checked to determine whether automatic migration is applicable. If prior instructions have been received from the consumer indicating that automatic migration is to be performed, then the issuer migrates or transitions the consumer's event-oriented card to another type of consumer-category card corresponding to a stage more appropriate for the consumer.

In an embodiment of the present invention, occurrence of the event is determined using registration information provided by the merchant.

In another embodiment of the present invention, if prior instructions authorizing automatic migration have not been received from the consumer and it has been determined that the planned event has taken place, the consumer is provided with promotional information encouraging the consumer to migrate her event-oriented card to another type of consumer-category card.

Further features and aspects of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a system, a method, and a computer program product for an issuer of a financial transaction instrument to transition or migrate an account holder from one type of financial transaction account to another type of financial transaction account based on changes in the account holder's situation. Such changes are based on predetermined criteria such as, for example, an occurrence of an event date, an enrollment in a particular program, a subscription to a particular magazine or program, or the like.

According to an embodiment of the present invention, when the issuer becomes aware of a change in the account holder's situation, the account holder's financial transaction account is automatically migrated to another financial transaction account. The automatic migration is premised on the prior authorization by the account holder for future migrations as the account holder's situation changes.

According to another embodiment of the present invention, when the issuer becomes aware of a change in the account holder's situation, the issuer notifies the account holder that his financial transaction account is eligible to be migrated to another type of financial transaction account, and also notifies the account holder of the benefits of the other type of financial transaction account.

Preferably, the financial transaction instrument is a consumer-category card associated with a merchant, and the issuer and the merchant jointly promote the card to the general public or to a targeted segment of the general public. The card and the financial transaction account underlying the card provide benefits especially relevant to consumers of a particular consumer category. When the account holder's situation changes, as indicated by the occurrence of one or more predetermined criteria, the card and the financial transaction account are eligible for migration to a "next stage," which has benefits especially relevant to consumers of a consumer category that may be a natural progression from the previous consumer category. If the account holder opts for migration, a different type of consumer-category card is issued to the account holder, which provides different benefits that are more suited to the account holder's current situation. The underlying financial transaction account also undergoes migration, which may simply entail updating the personal information on the account holder to reflect his current consumer category without changing other details of the account, i.e., without changing the account number, the credit limit, the balance, the billing address, the contact information, etc.

As used herein, the term "merchant" refers to any person, entity, distributor system, software, and/or hardware that is a provider or broker of goods/services, and includes any other entity in the distribution chain of goods/services. For example, a merchant may be a grocery store, a retail store, a travel agency, a service provider, a public-service utility, a school, a library, an on-line merchant, a government agency, or the like. Also, as used herein, the terms "consumer,""customer," "cardholder," "account holder," and "user" may be used interchangeably to refer to a person who purchases goods/services from a merchant using a card.

II. System

Figure 1:
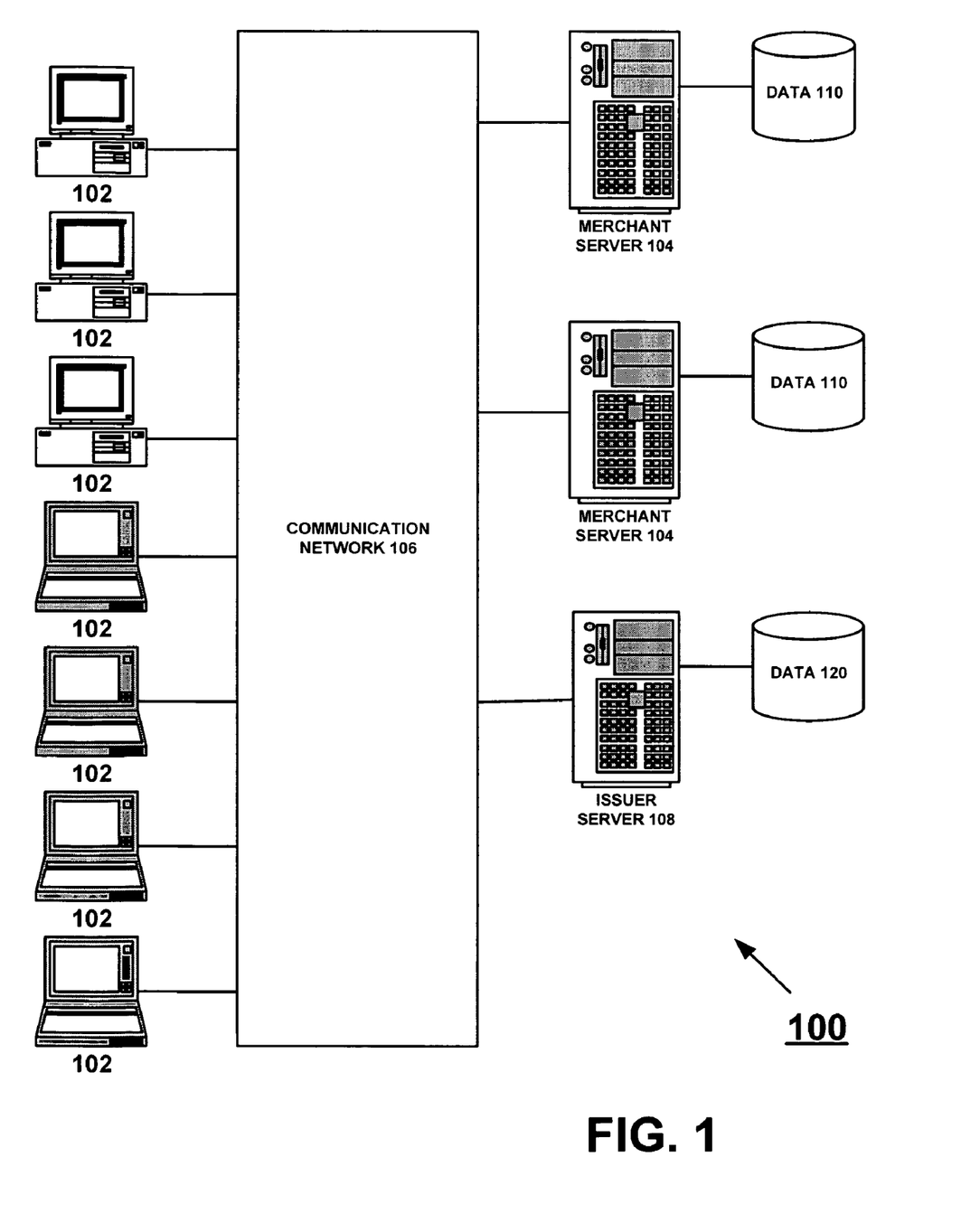
FIG. 1 schematically illustrates a system diagram of an exemplary migration system, according to an embodiment of the present invention.

FIG. 1 shows a schematic system diagram of an exemplary migration system 100 used to implement or practice one or more embodiments of the present invention. The system 100 includes at least one consumer communication device 102 configured to communicate with a merchant server 104 via a communication network 106. The merchant server 104 is configured to present the communication device 102 with an interactive Web site ("merchant Web site"). The communication network 106 may be the Internet, a public switched telephone network ("PSTN"), a cellular communication network, a satellite communication network, or any other means of communication between the communication device 102 and the merchant server 104, whether wired or wireless.

Preferably, the communication network 106 is the Internet, and the merchant server 104 is configured to communicate with an issuer server 108 via the communication network 106. The issuer server 108 is configured to present the communication device 102 with an interactive Web site ("issuer Web site"), and the merchant Web site provides a so-called Web "link" to the issuer's Web site using well-known software programming techniques.

The merchant server 104 includes a data storage unit 110 configured to store registration information of consumers who register with the merchant via the merchant Web site. The issuer server 108 includes a data storage unit 120 configured to store applicant information of consumers who apply for a financial transaction instrument via the issuer Web site through the link between the merchant Web site and the issuer Web site. The applicant information includes association information indicating that the applicant has registered with the merchant. The association information enables the issuer to categorize the applicant in a consumer category easily, through knowledge of the associated merchant.

As shown in FIG. 1, the system 100 may include more than one merchant server 104, each corresponding to a different merchant and/or several corresponding to one merchant.

The applicant information also includes instructions from the applicant as to whether he or she wants the issuer automatically to migrate his or her financial transaction instrument to another type of financial transaction instrument (e.g., another type of consumer-category card), which may be more suited to the applicant as he or she goes through various life stages. The automatic migration may be performed a plurality of times corresponding to a plurality of different types of consumer categories, which correspond to a plurality of different life stages.

For example, if the applicant arrived at the issuer Web site through a link with a merchant Web site for wedding-related information and goods/services, then the card issued to the applicant may be categorized as a "pre-wedding bride/groom" card, which provides its account holder with various wedding-related benefits from the merchant and/or the issuer. An example of such a Web site is theknot.com, which corresponds to the merchant The Knot.

The issuer periodically obtains from the merchant a list of registrants who have had weddings within a pre-defined time period. The list may be provided from the merchant server 104 to the issuer server 108 via the communication network 106. The issuer server 108 compares the list with a list of account holders stored in the data storage unit 120 to determine which account holders have had weddings within the pre-defined time period. In this case, the predetermined criteria is a date-based trigger and is the occurrence of account holder's wedding in the pre-defined time period.

For each of the account holders who are on the list of registrants obtained from the merchant and therefore has satisfied the date-based predetermined criteria, the issuer server 108 checks the account holder's account information to determine whether automatic migration is applicable. If prior instructions have been received from the account holder indicating that automatic migration is to be performed, then the issuer server 108 automatically migrates or transitions the account holder's pre-wedding bride/groom card to another type of consumer-category card corresponding to the next life stage, for example, a "young family" card. The young family card provides the account holder with benefits of particular interest to young couples that may be seeking to buy furniture and other household items, or seeking advice on buying a home. The issuer in conjunction with a next-stage merchant may offer account holders of young family cards discounts on goods/services purchased from the next-stage merchant using the young family card. The next-stage merchant is a merchant that provides goods/services and information that are of particular interest to young couples. An example of such a merchant is The Nest, which is associated with the Web site thenest.com.

The automatic migration performed by the issuer server 108 includes providing the account holder with a notification that his account will be migrated to the next stage. The notification may be via e-mail to a communication device 102 of the account holder or via other conventional mail delivery channels. The issuer server 108 then submits the account holder's account information for issuance of a next-stage card.

In a like manner, upon obtaining information that the account holder has become a parent, such as through a list of registrants obtained from a merchant of baby goods/services, the issuer may transition or migrate the account holder's young family card to, for example, a "parent" card.

The issuer can obtain information regarding changes in the account holder's situation from various sources. In addition to the sources mentioned above, the issuer may obtain a list of registrants or subscribers from AARP® (American Association for Retired Persons). In this case, the predetermined criterion for triggering migration is a subscription to a type of organization. As will be appreciated by those of ordinary skill in the relevant art(s), other sources of account-holder information and other migration triggers may be used with the present invention.

If prior instructions indicating that automatic migration is to be performed have not been received from the account holder, then the issuer server 108 submits information on the account holder to a promotions module, which sends the account holder promotional information on the benefits of migrating his card to the next stage. The promotional information may be sent via the communication network 106 or via other conventional mail delivery channels. If the account holder fails to reply to the promotional information or declines migration, the issuer server 108 retains the account holder's information in the data storage unit 120 in its current consumer category. If the account holder replies requesting migration, then the issuer server 108 provides the account holder with a notification that his account will be migrated to the next stage. The issuer server 108 then submits the account holder's account information for issuance of a next-stage card.

III. Process

Figure 2A:
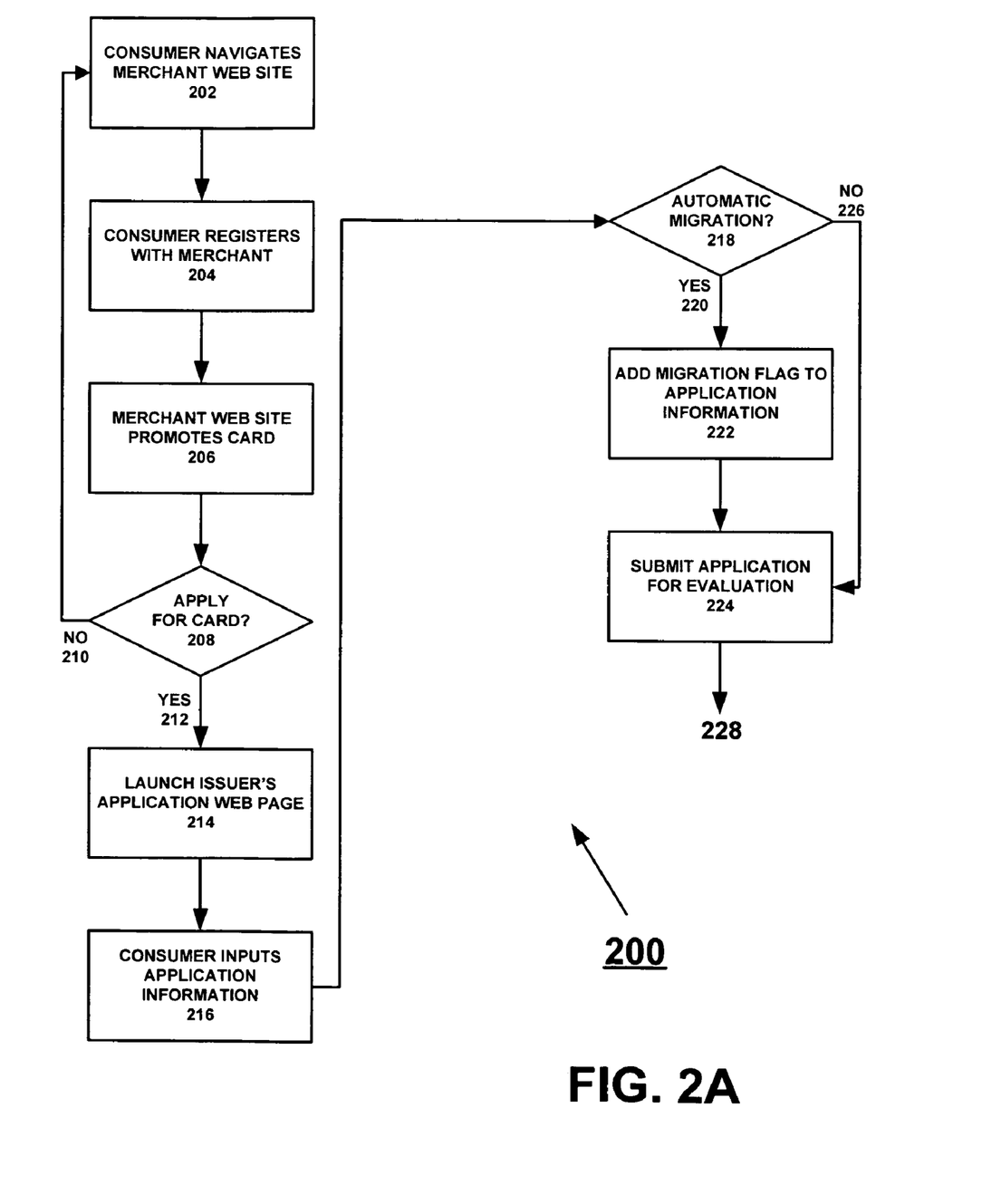
FIGS. 2A and 2B show flowcharts illustrating a cardholder migration process, according to an embodiment of the present invention.

Referring to FIG. 2A, a flowchart illustrating a cardholder migration process 200, according to an embodiment of the present invention, is shown. Preferably, the process 200 utilizes the migration system 100. The process 200 begins at step 202, at which a consumer uses a communication device 102 to access the merchant server 104 to visit a Web site of a merchant that has a joint marketing/promotional program with an issuer to promote a financial transaction instrument. For example, the consumer is a bride-to-be, the merchant provides wedding information and/or sells wedding goods/services, and the issuer and the merchant have agreed to jointly promote a wedding-related credit card ("wedding card"). At step 204, the bride-to-be registers with the merchant and provides the merchant with registration information, such as her name, her address (email and/or residential), and the planned wedding date. At step 206, the merchant Web site presents the bride-to-be with a Web page promoting the benefits of having a wedding card. The benefits may include any or all of: discount coupons for caterers, florists, bridal shops, or the like; tickets to preview bands, singers, disc jockeys, or the like; cash-back rewards for purchases made from selected stores and service providers; etc. At step 208, the bride-to-be decides whether to apply for a wedding card. If the bride-to-be chooses not to apply for a wedding card, the bride-to-be can continue navigating the merchant's Web site, at step 210. The bride-to-be's registration information may be subsequently provided to the issuer, to enable the issuer to send follow-up material promoting the wedding card.

At step 212, if the bride-to-be chooses to apply for a wedding card by clicking on an appropriate button on the Web page, the merchant server 104 causes the Web page to link to the issuer server 108 to launch an application Web page at the issuer Web site, at step 214. The application Web page enables the bride-to-be to input the necessary application information in an on-line process. At step 216, the bride-to-be inputs typical application information, such as employment information, salary, etc. Optionally, the application Web page may request input of the planned wedding date; however, because the planned wedding date has already been provided to the merchant in the registration process, input of this information is not required.

At step 218, the application Web page asks the bride-to-be to indicate whether she would like to take part in the issuer's life-stage program and receive special offers and other information after the wedding, such as special offers on furniture and other home furnishings, information on buying a house, and/or the like, through automatic transition or migration of the wedding card to one or more subsequent cards corresponding to one or more subsequent life stages. If the bride-to-be indicates that she would like to take part in the life-stage program, at step 220, the application is flagged for automatic migration, at step 222. At step 224, the application is submitted for evaluation. If the bride-to-be does not indicate that she would like to continue with the life-stage program, at step 226, the process 200 proceeds to step 224 and the application is submitted for evaluation. The process 200 then proceeds to step 228, shown in FIG. 2B.

Figure 2B:
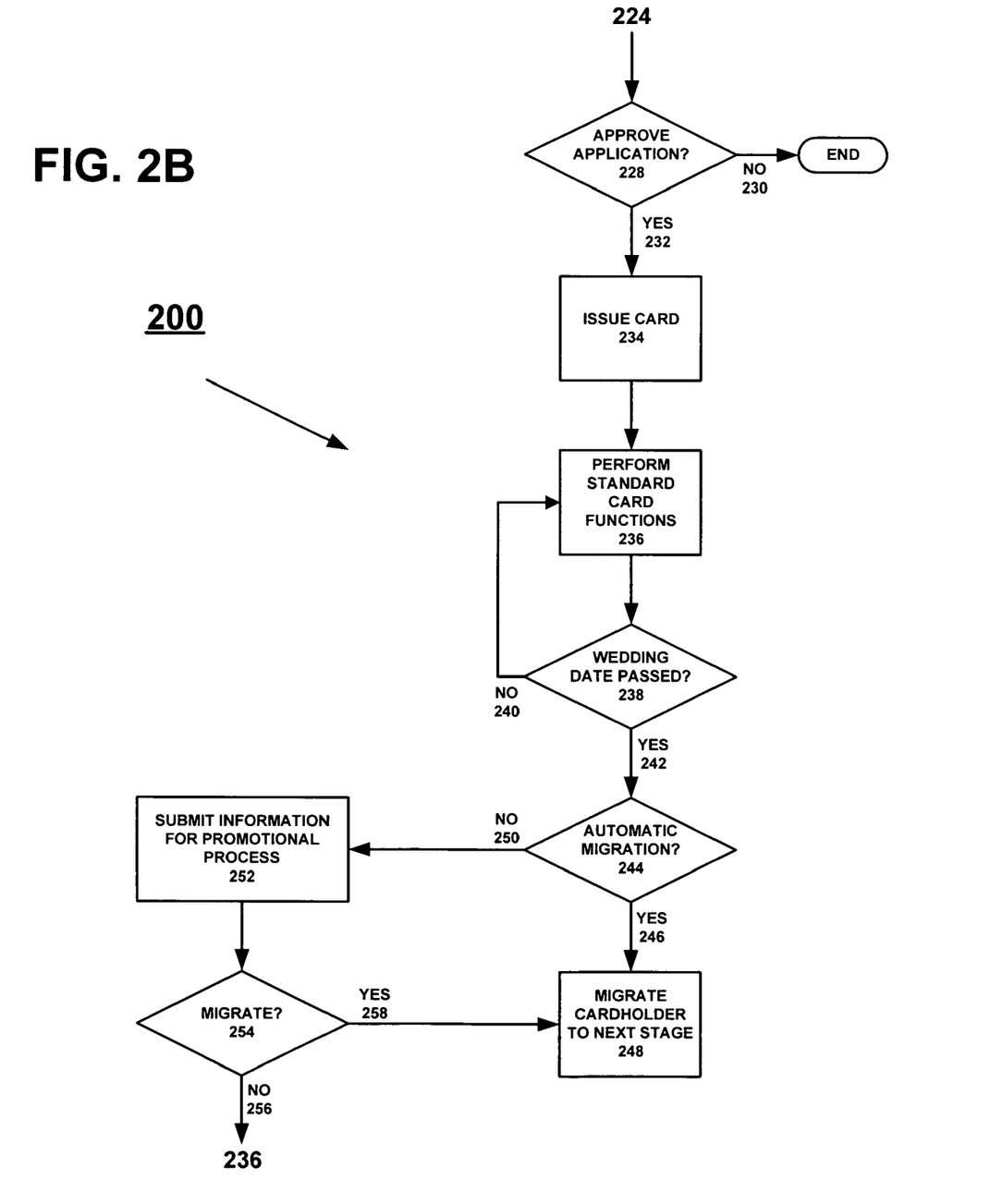

At step 228, the application is evaluated and the issuer decides whether to approve or deny the application. If the application is denied, at step 230, the bride-to-be is notified of the denial and the process 200 ends. If the application is approved, at step 232, the bride-to-be is issued a wedding card, at step 234. The wedding card then may be used to perform standard card functions for that type of card, at step 236.

At step 238, it is determined whether the wedding date has passed (i.e., whether the migration trigger has occurred) for the bride-to-be, by determining whether the current date is after the wedding date. This step may be performed based on the application information, which includes the wedding date, provided by the bride-to-be. Alternatively, this step may be performed by obtaining from the merchant a list of registrants who have had weddings within a pre-defined time period that has passed. The list may be provided from the merchant server 104 to the issuer server 108 via the communication network 106. The issuer server 108 compares the list with a list of account holders stored in the data storage unit 120 to determine which account holders have had weddings within the pre-defined time period.

At step 240, if it is determined that the bride-to-be's wedding date has not yet passed, the process 200 returns to step 236. At step 242, if it is determined that the wedding date has passed, the issuer server 108 checks the account information for the bride-to-be (now the bride) to determine whether automatic migration is applicable, at step 244. At step 246, if prior instructions have been received from the bride indicating that automatic migration is to be performed, then the issuer server 108 migrates or transitions the bride's wedding card to another type of consumer-category card corresponding to the next life stage, at step 248, such as the young family card discussed above, for example.

The automatic migration performed by the issuer server 108 includes providing the bride with a notification that her account will be migrated to the next stage. The notification may be via e-mail to a communication device 102 of the bride or via other conventional mail delivery channels. The issuer server 108 then submits the bride's account information for issuance of a next-stage card. Additionally, the issuer server 108 updates the bride's account information to reflect that the bride has entered the next stage.

At step 250, if prior instructions have not been received from the bride indicating that automatic migration is to be performed, then information on the bride is submitted to a promotional module, at step 252, which provides the bride with promotional information about the benefits of migrating her wedding card to a new card corresponding to the next life stage. The promotional information may be sent via the communication network 106 or via other conventional mail delivery channels. Included in the promotional information is a request for the bride to authorize migration of her wedding card, at step 254. If the bride fails to reply to the request or declines migration, at step 256, the issuer server 108 retains the bride's information in the data storage unit 120 in its current consumer category. The process 200 then returns to step 236 and the wedding card may continue to be used to perform the standard card functions for that type of card. At step 258, if the bride authorizes migration, then the process 200 proceeds to step 248 at which the issuer server 108 migrates the brides account to, for example, the young family category and submits the bride's account information for issuance of a next-stage card.

IV. EXAMPLE IMPLEMENTATION(s)

The present invention (i.e., migration system 100, the cardholder migration process 200 or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 3:
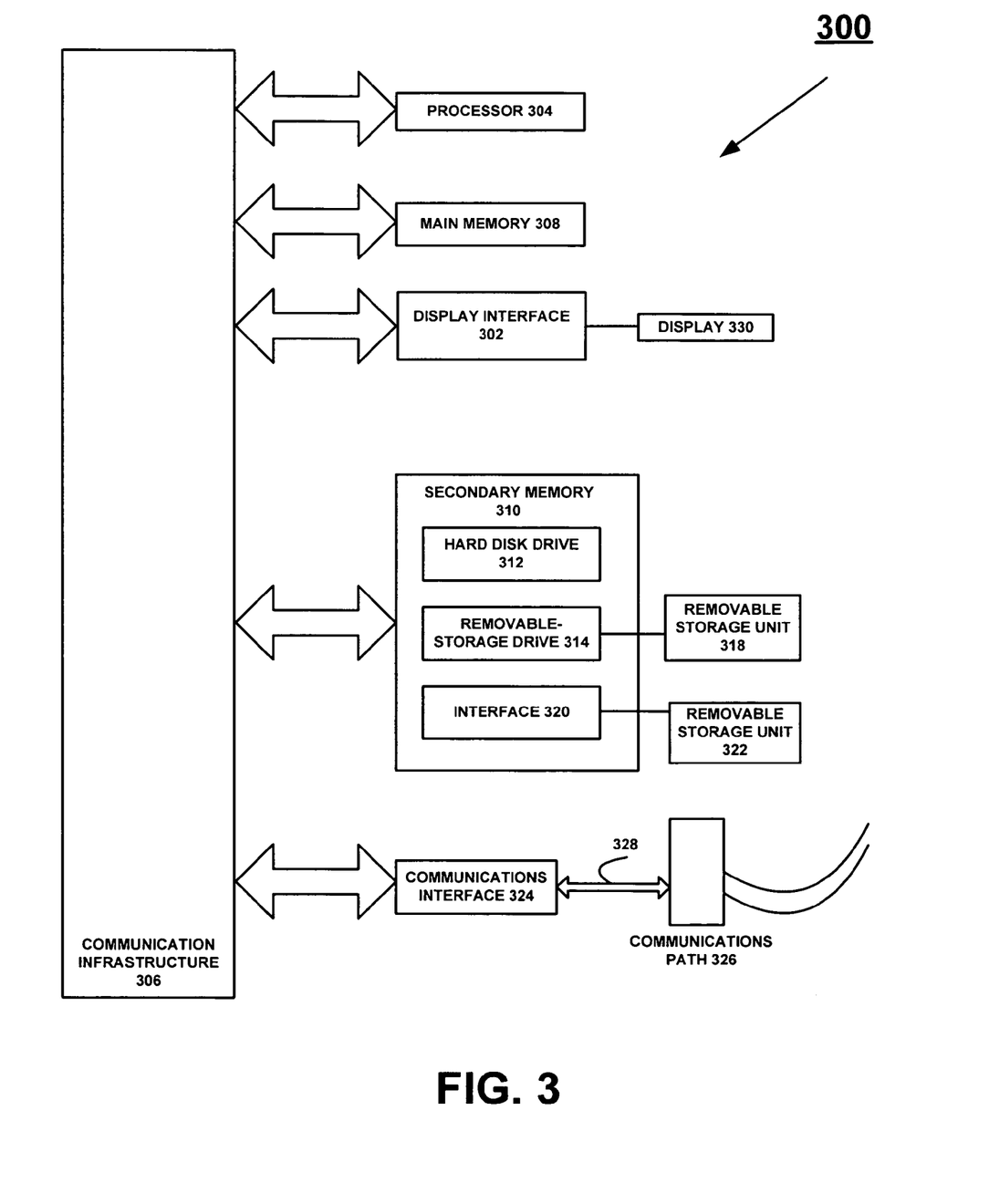
FIG. 3 shows a block diagram of an exemplary computer system useful for implementing the present invention.

In fact, in one embodiment, the present invention is directed toward one or more computer systems equipped to carry out the functions described herein. An example of such a computer system 300 is shown in FIG. 3.

The computer system 300 includes at least one processor 304. The processor 304 is connected to a communication infrastructure 306 (e.g., a communications bus, a cross-over bar device, or a network). Although various software embodiments are described herein in terms of this exemplary computer system 300, after reading this description, it will become apparent to a person skilled in the relevant art(s) how to implement the invention using other computer systems and/or architectures.

The computer system 300 includes a display interface 302 that forwards graphics, text, and other data from the communication infrastructure 306 (or from a frame buffer (not shown)) for display on a display unit 330.

The computer system 300 also includes a main memory 308, which preferably is a random access memory (RAM) and may also include a secondary memory 310. The secondary memory 310 may include, for example, a hard disk drive 312 and/or a removable-storage drive 314 (e.g., a floppy disk drive, a magnetic tape drive, an optical disk drive, and the like). The removable-storage drive 314 reads from and/or writes to a removable storage unit 318 in a well-known manner. The removable storage unit 318 may be, for example, a floppy disk, a magnetic tape, an optical disk, and the like, which is written to and read by the removable-storage drive 314. As will be appreciated, the removable storage unit 318 includes a computer-usable storage medium having stored therein computer software and/or data.

In alternative embodiments, the secondary memory 310 may include other similar devices for allowing computer programs or other instructions to be loaded into the computer system 300. Such devices may include a removable storage unit 322 and an interface 320 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 322 and interfaces 320 that allow software and data to be transferred from the removable storage unit 322 to the computer system 300.

The computer system 300 may also include a communications interface 324, which allows software and data to be transferred between the computer system 300 and external devices (not shown). Examples of the communications interface 324 may include a modem, a network interface (e.g., an Ethernet card), a communications port, a Personal Computer Memory Card International Association ("PCMCIA") interface, and the like. Software and data transferred via the communications interface 324 are in the form of signals 328, which may be electronic, electromagnetic, optical or another type of signal that is capable of being received by the communications interface 324. These signals 328 are provided to the communications interface 324 via a communications path 326 (e.g., a channel). The communications path 326 carries the signals 328 and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit 318 used with the removable-storage drive 314, a hard disk installed in the hard disk drive 312, or and the signals 328, for example. These computer program products provide software to the computer system 300. The present invention may be implemented or embodied as one or more of such computer program products.

Computer programs (also referred to as computer control logic) are stored in the main memory 308 and/or the secondary memory 310. The computer programs may also be received via the communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the present invention is implemented using software, the software may be stored in a computer program product and loaded into the computer system 300 using the removable-storage drive 314, the hard drive 312, or the communications interface 324. The control logic (software), when executed by the processor 304, causes the processor 304 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A method for migrating a first type of financial transaction instrument to a second type of financial transaction instrument, the method comprising the steps of:
    obtaining a list of consumers for which an event has occurred during a pre-defined period of time;
    comparing the list of consumers with a list of account holders of the first type of financial transaction instrument to determine an account holder for which the event has occurred during the pre-defined period of time;
    determining that the account holder has provided prior instructions authorizing automatic migration of a financial transaction instrument belonging to the account holder to another type of financial transaction instrument; and,
    migrating the financial transaction instrument belonging to the account holder to the second type of financial transaction instrument by:
        issuing the second type of financial transaction instrument to the account holder,
        notifying the account holder that migration has taken place or will take place, and
        updating account information for the account holder to indicate migration to the second type of transaction instrument.

2. A method according to claim 1, wherein the event is a wedding, the first type of financial transaction instrument is a wedding-oriented financial transaction instrument, and the second type of financial transaction instrument is a young-couple-oriented financial transaction instrument.

3. A method according to claim 1, wherein the list of consumers is obtained from a merchant.

4. A method according to claim 1, wherein the steps of comparing, determining, and migrating are performed by a computer.

5. A method according to claim 1, wherein the event includes an occurrence of an event date, an enrollment in a particular program, or a subscription to a magazine or program.

6. A method for migrating a first type of financial transaction instrument to a second type of financial transaction instrument, the method comprising the steps of:
    obtaining a list of consumers for which an event has occurred during a pre-defined period of time;
    comparing the list of consumers with a list of account holders of the first type of financial transaction instrument to determine an account holder for which the event has occurred during the pre-defined period of time;
    providing the account holder with promotional information regarding the benefits of migrating from the first type of financial transaction instrument to the second type of financial transaction instrument;
    requesting the account holder to authorize migration;
    migrating the first type of financial transaction instrument belonging to the account holder to the second type of financial transaction instrument by:
        issuing the second type of financial transaction instrument to the account holder, and
        updating account information for the account holder to indicate migration to the second type of transaction instrument.

7. A computer-implemented method according to claim 6, wherein the event includes an occurrence of an event date, an enrollment in a particular program, or a subscription to a magazine or program.

8. A financial transaction system comprising a server and a memory storing computer-executable code that, when executed by the server, causes the server to implement a method for migrating a first type of financial transaction instrument to a second type of financial transaction instrument, wherein the computer-executable code causes the server:
    to receive a list of consumers for which an event has occurred during a pre-defined period of time;
    to compare the list of consumers with a list of account holders of the first type of financial transaction instrument to determine an account holder for which the event has occurred during the pre-defined period of time;
    to provide the account holder with promotional information regarding the benefits of migrating from the first type of financial transaction instrument to the second type of financial transaction instrument;
    to request the account holder to authorize migration; and
    to migrate the first type of financial transaction instrument belonging to the account holder to the second type of financial transaction instrument by:
        issuing the second type of financial transaction instrument to the account holder, and
        updating account information for the account holder to indicate migration to the second type of transaction instrument.

9. A computer-readable storage medium storing computer-executable code that, when executed by a computer, causes the computer to implement a method for migrating a first type of financial transaction instrument to a second type of financial transaction instrument, wherein the method comprises steps of:

receiving a list of consumers for which an event has occurred during a pre-defined period of time;

comparing the list of consumers with a list of account holders of the first type of financial transaction instrument to determine an account holder for which the event has occurred during the pre-defined period of time;

providing the account holder with promotional information regarding the benefits of migrating from the first type of financial transaction instrument to the second type of financial transaction instrument;

requesting the account holder to authorize migration; and migrating the first type of financial transaction instrument belonging to the account holder to the second type of financial transaction instrument by:

issuing the second type of financial transaction instrument to the account holder, and updating account information for the account holder to indicate migration to the second type of transaction instrument.

\* \* \* \* \*